Feb. 15, 1966  C. L. LOVERCHECK  3,235,032
MEANS FOR HEATING THE OIL SUMP OF AN ENGINE
Filed May 16, 1963

3,235,032
MEANS FOR HEATING THE OIL SUMP OF AN ENGINE
Charles L. Lovercheck, 632 W. 7th St., Erie, Pa.
Filed May 16, 1963, Ser. No. 280,912
1 Claim. (Cl. 184—104)

This invention relates to engine starting devices and, more particularly, to devices for starting engines having oil supplies in cold weather.

Automotive truck engines, aircraft engines, tractor engines, and the like which are exposed to cold weather conditions experience stiffening of the oil which makes it very difficult to start them. After the engine starts, considerable wear results on the various parts before the stiff oil finally comes up to temperature to provide proper lubrication.

Various starting devices have been proposed but none of these have been efficient to overcome the foregoing difficulties.

It is, accordingly, an object of the present invention to provide a starting device for engines wherein a tubular member open to atmosphere at both ends extends entirely through the oil supply in the oil sump of the engine. It has been discovered that a gas torch such as a protane torch commonly used for soldering can be inserted in one end of this tube and the major portion of the heat from the torch will be dissipated in the tube.

Another object of the invention is to provide an improved engine starting device.

Still another object of the invention is to provide an improved heating device.

A further object of the invention is to provide a starting device which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

Figure 1:
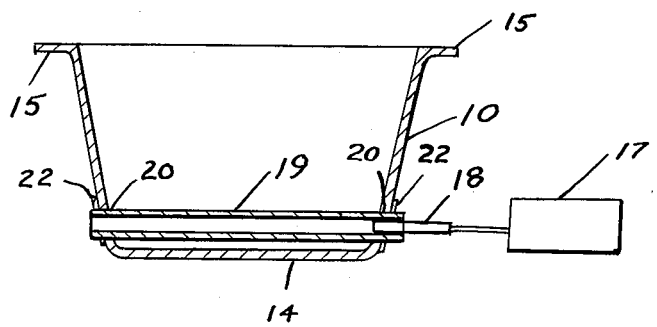
FIG. 1 is a lateral cross sectional view of a heating device according to the invention in a crankcase.

Now with more particular reference to the drawing, numeral 10 indicates the oil pan or crankcase of an engine such as an aircraft engine, automotive engine, or truck engine. The oil pan 10 has connecting rod bearings 11 shown schematically and extending downwardly therein. The oil pan 10 has ends 12 and 13, a bottom 14, and a peripheral flange 15 for connecting the oil pan to the engine in the usual manner. The oil pan is shallower at a bottom portion 15' and it slants downward so that the major portion of the oil can collect in the sump over the bottom portion 15' from which it can be pumped by a suitable oil pump.

A torch 17 has a tubular nozzle 18 of a conventional type used to provide a flame for soldering which may be inserted in the ends of a tubular member or tube 19. The tubular member 19 is fitted into holes 20 which are adjacent the bottom of the oil pan 10. The ends of the tube can be sealed to the oil pan by means of an epoxy type resin glue or by welding, brazing, or other suitable fastening means. They could be attached by means of nuts on the ends of the tubular member 19. Members 22 may be considered to be nuts. The members 22 can also be considered to be washers which would overlie the epoxy glue and form a greater bonding surface between it and the tubular member.

A tubular member found suitable for this purpose is a three-quarter inch inside diameter pipe with approximately a seven-eighth inch outside diameter. This could be of hard copper of the type conventionally used in water supply systems or it could be a stainless steel pipe.

It has been discovered that gas from a torch such as shown in FIG. 1 will burn in the tubular member 19 and a high percentage of the heat therefrom will be dissipated to the oil so that the oil can be heated up in a very few minutes and at a very nominal cost.

Figure 2:
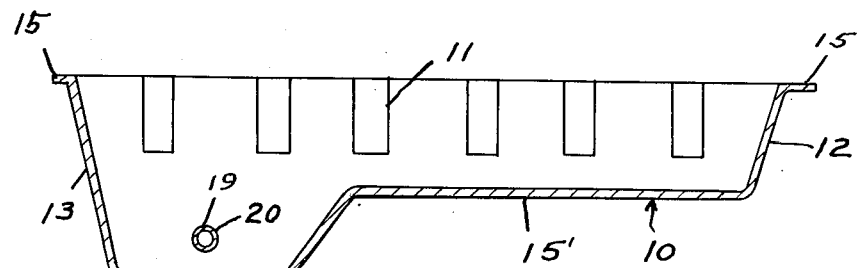
FIG. 2 is a longitudinal cross sectional view through the heating tube installed in an engine crankcase.
Figure 3:
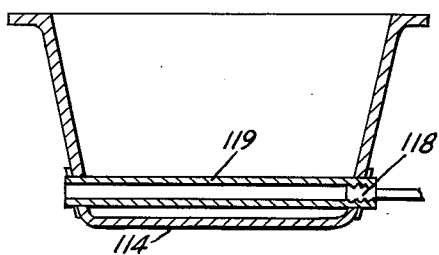
FIG. 3 is a view similar to FIG. 1 of another embodiment of the invention.

Instead of the gas heater shown in FIGS. 1 and 2, an electric cartridge type heater 118 shown in FIG. 3 can be inserted into the tubular member 119 shown in FIG. 3 in the crankcase sump. This electrical heater could be screwed into one end of the tubular member and allowed to remain there as a permanent fixture. In this case, the size of the tubular member could conceivably be slightly increased.

The foregoing specification sets forth the invention in its preferred practical forms but the structure shown is capable of modification within a range of equivalents without departing from the invention which is to be understood is broadly novel as is commensurate with the appended claim.

I claim:

In combination, an engine having an oil sump and a heating means therefor,
  said sump having side walls and a bottom,
  a hole through two of said side walls,
  each said hole being opposite the other, adjacent the bottom of said sump and in alignment with each other,
  a horizontally disposed one piece straight tubular member having an opening entirely therethrough received in said holes and having the outside surface of said tubular member sealingly attached thereto,
  and heating means in said tubular member to heat the oil in said sump,
  said heating means being a gas burner having a cylindrical end member inserted in one end of said tubular member with the burned gases therefrom escaping from the opposite end of said tubular member,
  said gas burner having a generally cylindrical outside surface which is received in said one end of said tubular member.

References Cited by the Examiner
UNITED STATES PATENTS

| | | | |
|---|---|---|---|
| 1,657,151 | 1/1928 | Corlew et al. | 184—104 |
| 1,747,772 | 2/1930 | Haze | 184—104 |
| 1,762,464 | 6/1930 | Belfield | 184—104 |
| 2,839,332 | 6/1958 | Sackett | 184—104 |
| 2,916,030 | 7/1959 | Hoeth | 184—104 |

LAVERNE D. GEIGER, *Primary Examiner.*

M. KAUFMAN, *Examiner.*